United States Patent Office 3,412,792
Patented Nov. 26, 1968

3,412,792
OIL RECOVERY PROCESS
Harry W. Parker and Robert R. Harvey, Bartlesville, Okla., assignors to Phillips Petroleum Company, a corporation of Delaware
No Drawing. Filed June 5, 1967, Ser. No. 643,362
3 Claims. (Cl. 166—9)

ABSTRACT OF THE DISCLOSURE

A method of producing oil utilizing an aqueous slug of an oil-displacing surfactant, a dispersing surfactant and minute solids, such as carbon black, which have been modified to increase the degree to which the particles are hydrophilic.

---

In one aspect this invention relates to producing oil from an oil-bearing stratum. In another aspect this invention relates to increasing the efficiency of an aqueous fluid drive utilizing oil-displacing surfactants. In another aspect this invention relates to forming a stable suspension of carbon black particles in an aqueous medium.

Certain minute solids, such as carbon black, when suspended in an aqueous slug containing dissolved surfactants having oil-displacing properties, function as carriers for displacing surfactants more effectively transporting the surfactants into the stratum, thus displacing more oil. Among the surfactants effective in displacing oil are nonionic surfactants having the formula

R—R'—R"—OH wherein R is an aliphatic alkyl of 9 to 20 carbon atoms or an alkylaryl in which the alkyl has from 8 to 12 carbon atoms and the aryl is attached to the R', R' is O or S, and R" is polyethylene oxide having an average of 4 to 6.5 units. They belong to the families of polyoxyethylene or polyphenoxyethylene ethers and thioethers.

While a process utilizing such a surfactant carrier provides greater penetration of the stratum and dispersion of the surfactant than processes utilizing the surfactant alone, the suspension, particularly those made with carbon black, tends to settle out or the particles tend to agglomerate if the suspensions are allowed to stand for any length of time. There is a tendency to plug in the stratum when brackish water is encountered. To overcome these difficulties certain dispersing surfactants are often added to improve the stability of the suspension. These surfactants have little or no oil-displacing property but have a greater dispersing capacity than the oil-displacing surfactants. They are surfactants having the formula R—O—R'—OH wherein R is an aliphatic alkyl of 5 to 20 carbon atoms or an alkylaryl, the alkyl having 8 to 20 carbon atoms and R' is polyethylene oxide of an average of 30 to 100 units or mols. The number of units of ethylene oxide in the hydrophilic chain is at least 30, surfactants with a lesser chain having little or no dispersing effect when incorporated in the suspension of solids in the oil-displacing surfactant solution.

The invention provides an improved carbon black-surfactant oil recovery process by modifying the carbon black to increase the degree to which the carbon black is hydrophilic. By so modifying the carbon black, the amount of dispersing surfactant necessary to form a stable suspension of carbon black is reduced.

Accordingly it is an object of the invention to provide an improved method of recovering oil.

Another object of the invention is to improve the stability of aqueous carbon black suspensions.

Another object of the invention is to reduce the cost of an aqueous fluid drive process which utilizes carbon black-surfactant aqueous suspensions.

These and other objects will be apparent to one skilled in the art upon consideration of the specification and appended claims.

According to the invention, there is provided a method of forming a stable suspension of carbon black, a water soluble dispersing surfactant and a water soluble water-displacing surfactant, each in minor but effective concentrations in water, comprising the steps of modifying the carbon black to increase the degree to which it is hydrophilic, mixing the modified carbon black with water and mixing the surfactants with the mixture of carbon black and water.

Further according to the invention oil is recovered from an oil stratum by injecting an aqueous slug of the modified carbon black and surfactants through a well bore into the stratum, thereafter injecting an aqueous driving fluid so as to move the slug through the stratum toward at least one offset well, displacing oil thereinto and recovering oil from the offset well.

The carbon black of the invention can be modified by oxidizing, sulfonating or ethoxylating to increase the degree to which the carbon black is hydrophilic. In one embodiment, the carbon black is oxidized or partially oxidized by reacting the carbon with air at elevated temperatures. Other conventional oxidizing agents such as ozone or hydrogen peroxide can be utilized to supply active oxygen to the carbon black at low temperatures. Other oxidation methods include exothermically reacting the carbon black in an aqueous solution of sodium hypochlorite. A method for partially oxidizing carbon black is disclosed in the patent to M. M. Johnson, 3,306,761, issued Feb. 28, 1967.

The condensed aromatic structure present in carbon black permits a degree of sulfonation which allows modification to obtain a more hydrophilic carbon black. Sulfonation can be accomplished by slurrying the carbon black in a hexane solution and adding sulfur trioxide to the slurry. The carbon black can also be sulfonated using sulfur trioxide in a ball mill under vacuum.

In another embodiment of the invention, oxidized or partially oxidized carbon black is modified by reacting with ethylene oxide to obtain ethoxylated carbon black which is hydrophilic. The carbon black can be reacted in a ball mill with ethylene oxide under about 0.1 to 1000 mm. of Hg to obtain the ethoxylated product. The ethylene oxide-carbon black bond, formed in such a reaction, is much stronger than the bond formed by absorption such as when a surfactant containing ethylene oxide is mixed with the carbon black in an aqueous solution. A chemical reaction, such as reaction with gaseous ethylene oxide in the presence of a basic or acidic catalyst, can be used to ethoxylate the oxidized carbon black.

Oil is displaced from an oil-bearing stratum by incorporating the modified carbon black in an aqueous solution of the dispersing surfactant and the oil-displacing surfactant and injecting a slug of the resulting aqueous suspension into the stratum in advance of an aqueous driving medium such as water and/or steam. The carbon black is of a size in the range of 0.001 to 1 micron and the quantity of carbon black is in the range of 0.05 to 2 weight percent of the solution. The concentration of oil-displacing surfactant in solution is in the range of 0.001 to 2 weight percent, preferably 0.01 to 1 weight percent and a similar concentration of dispersing surfactant is used. The size of the slug to be injected in such an aqueous fluid drive depends upon the particular characteristics of the stratum, but will generally be in the range of 0.05 to 1 pore volume of the stratum to be swept by the slug.

The slug is driven through the stratum by the driving medium to displace oil. The modified carbon black, acting as a carrier for the oil-displacing surfactant, effectively transports the surfactant into the stratum and displaces oil. The slug and displaced oil are driven through the stratum toward an offset well, preferably a plurality of offset wells in a ring pattern, and displaces these effluents into the well. The oil is then recovered from the well bore by conventional production means.

It is believed that the dispersing surfactant is loosely bonded to the carbon black particle and as the particle progresses through the stratum, the dispersing surfactant is desorbed and given up to the stratum. Once the dispersing surfactant is adsorbed on the pore walls and interstitial spaces of the stratum, the carbon black particle reverts to its hydrophobic nature and settles out of suspension especially in the presence of salt water. By modifying the carbon black so that it is hydrophilic, the carbon black remains in suspension after the dispersing surfactant is lost to the stratum, permitting the suspension to be driven further into the stratum than when unmodified carbon black is utilized as the carrier.

The following examples will demonstrate the stability of the modified carbon black suspension and further illustrate the invention.

EXAMPLE I

Shake tests are run to determine the long term stability of aqueous carbon black suspensions in the presence of a reservoir material. The shake test is a semi-quantitative determination, conducted in the absence of oil and oil-displacing surfactants but does provide a prediction of the effectiveness of the surfactant carrier in transporting the oil displacing surfactant.

Four aqueous suspensions having the following composition are prepared:

TABLE I

| Suspension No. | Type carbon black | Carbon black, wt. percent | Dispersing surfactant, wt. percent |
|---|---|---|---|
| 1 | Unmodified Philblack I | 0.10 | 0.06 |
| 2 | Oxidized Philblack I | 0.10 | 0.06 |
| 3 | Sulfonated Philblack I | 0.10 | 0.06 |
| 4 | Ethoxylated Philblack I | 0.10 | 0.06 |

The dispersing surfactant in all the suspensions is Igepal CO–990 (a trade name of Antara Chemical Company), a nonylphenoxy polyethanol having an average chain length on the hydrophilic end of 95–100 mols of ethylene oxide. Philblack I, a furnace black, is a trademark of Phillips Petroleum Company.

Three samples, each 30 grams, of washed dry Nacatoch outcrop sand, from the Smackover Field, located in Ovachita County in Arkansas, were weighed out into bottles. A 30 gram sample of sand in situ has a pore volume of about 10 cc. To these samples, 15, 20, and 30 milliliter portions of suspension #1 are added. These samples correspond respectively to 1.5×, 2.0× and 3.0× the pore volume of sand.

This sample preparation procedure is repeated for the other three suspensions. All samples are shaken for one hour and allowed to stand undisturbed for 4 days. Stability of the suspension after 4 days is observed visibly and is shown below:

TABLE II

| Suspension No. | 1.5×P.V. | 2.0×P.V. | 3.0×P.V. |
|---|---|---|---|
| 1 | U | U | S |
| 2 | U | S | S |
| 3 | U | S | S |
| 4 | S | S | S |

U=Unstable.
S=Stable.

The comparison of the suspensions show that between 2 and 3 pore volumes of unmodified carbon black suspension are necessary to form a stable mixture within the reservoir sand, while only between 1.5 and 2 pore volumes of the oxidized and sulfonated carbon black suspension are required for stability. The ethoxylated carbon black forms the most stable of the suspensions, utilizing less than 1.5 pore volumes of the suspension.

EXAMPLE II

Filtration tests are run to determine the ability of the suspension to penetrate reservoir materials.

Four suspensions having the same respective compositions of the suspensions of Example I are prepared and each suspension is mixed at high speed in a blender for 15 minutes. The discs utilized in filtration tests are formed by casting a section of a core of Burbank sand 1¼ inch in diameter in epoxy resin and the casting is sawed with a diamond saw into ⅛ inch thick discs having a 1¼ inch core section surrounded by an annular section of epoxy resin. Before sealing in epoxy, the core is cleaned by contacting and extracting with toluene. The disc is positioned in a standard millipore apparatus and attached to a vacuum funnel. The disc is sealed between the filter and a graduated cylinder, open to the sand core, so that the liquid introduced into the graduated cylinder can be passed through the sand core and filter into the vacuum flask. Three such discs are prepared and calibrated by flowing several 100 ml. portions of water through the discs under vacuum. When successive 100 ml. portions agree within a few seconds the sample is considered to be calibrated and this time is noted as the "water time." A 100 ml. portion of each suspension is then introduced and the time required for it to flow through under vacuum is noted.

TABLE III

| Suspension No. | Water flow time (seconds) | Suspension flow time (seconds) |
|---|---|---|
| 1 | 39 | (*) |
| 2 | 39 | 73 |
| 3 | 33 | 65 |
| 4 | 41 | 55 |

*Plugged after 40 ml. of flow.

This data show the increased filterability and reservoir penetration characteristics of carbon black suspensions which are modified to increase the degree to which they are hydrophilic.

EXAMPLE III

The oil displacing properties of aqueous solutions containing carbon black suspensions are determined by tube displacement tests. A 6 foot long steel tube having a ¾ inch diameter is packed with reservoir sand from the Nacatoch formation of the Smackover Field, located in Ovachita County, Ark. The sand is packed in the tube to obtain a porosity of approximately 35 to 40 percent. The tube is wrapped with electrical heating tapes and the temperature controlled to obtain a temperature of about 120° F. The tube is then flooded with Smackover crude to obtain a 100 percent oil saturation.

An aqueous flood solution of brine is prepared by adding 40 grams of sodium chloride, 10.5 grams of calcium chloride, 4.8 grams of magnesium chloride, containing 6 molecules of hydration to 1 liter of water. The tube is then flooded at a rate of 1 ml. per minute with the brine and the amount of oil produced and the water/oil ratio is measured. Flooding is continued until a water/oil ratio of 100 is obtained and the percent oil saturation is then determined. Upon completion of these steps conditions in the tube approximate conditions in a depleted reservoir.

Four aqueous slugs are prepared by mixing the brine solution with the different carbon blacks of Example I, the dispersing surfactant of Example I, and an oil-displacing surfactant as noted in various concentrations as noted in Table IV. Normal phenoxypolyethanol having an average chain length on the hydrophilic end of about 6 to 6.5 mols of ethylene oxide is used as the oil-displacing surfactant. Igepal CO–530 is a trade name of Antara Chemical Division of General Aniline and Film Corporation. The suspensions are then flooded through the tubes at a rate of 1 ml. per minute until a water/oil ratio of 100 in the produced fluid is obtained. The amount of additional oil produced (on a percent saturation basis) and the amount of additive slug (or suspension) on a pore volume basis is then determined. The table compares the results of such testing for the different suspensions.

TABLE IV

| Suspension composition | #1 | #2 | #3 | #4 |
|---|---|---|---|---|
| Igepal CO-530 (wt. percent) | 0.24 | 0.24 | 0.24 | 0.24 |
| Igepal CO-990 (wt. percent) | 0.24 | 0.24 | 0.24 | 0.24 |
| Unmodified Philblack I | 0.40 | | | |
| Oxidized Philblack I | | 0.40 | | |
| Sulfonated Philblack I | | | 0.40 | |
| Ethoxylated Philblack I | | | | 0.40 |

| Displacement tube | #1 | #2 | #3 | #4 |
|---|---|---|---|---|
| Oil saturation after flood with brine (percent) | 46.4 | 46.9 | 48.2 | 47.3 |
| Suspension breakthru, total suspension injected (Pore Volumes) | 1.37 | 1.25 | 1.10 | 0.95 |
| Oil produced by flooding with suspension (percent) | 18.0 | 18.1 | 19.3 | 18.6 |

As shown in Table IV flooding with modified carbon black suspensions of the invention at reduced volumes produces oil in amounts comparable to the unmodified carbon black suspension, confirming the indications given by the data of Examples I and II. Again the ethoxylated carbon black is the most effective of the three modified carbon blacks.

The improved stability of the modified carbon black suspensions can be used to realize economies in the amount of dispersing surfactant necessary to form a suspension of predetermined stability or it can be used to reduce the pore volume of an aqueous slug necessary to produce a given amount of oil.

Reasonable modification and variation are within the scope of this invention which discloses a novel method of producing oil.

That which is claimed is:

1. A process producing oil from an oil stratum by an aqueous fluid drive comprising the steps of:
    (1) injecting into said stratum through a well therein an aqueous slug comprising:
        (a) a suspension of carbon black particles selected from the group consisting of oxidized, sulfonated or ethoxylated carbon black of a size in the range of 0.001 to 1 micron in an amount in the range of 0.005 to 2 weight percent of said slug;
        (b) a surfactant having the formula

R—R'—R"—OH wherein R is an aliphatic alkyl of 9 to 20 carbon atoms or an alkylaryl in which the alkyl has 8 to 20 carbon atoms and the aryl is attached to R', R' is O or S, and R" is polyethylene oxide of an average of 4 to 6.5 units in solution in a concentration in the range of 0.01 to 1 weight percent;
        (c) a surfactant having the formula

R—O—R'—OH wherein R is an aliphatic alkyl of 5 to 20 carbon atoms or an alkylaryl, the alkyl having 8 to 12 carbon atoms and the aryl is attached to the O, and R' is polyethylene oxide of an average of 30 to 100 units in solution in a concentration in the range of 0.01 to 1 weight percent;
    (2) thereafter injecting aqueous driving medium through said well into said stratum so as to drive said suspension in surfactant solution through said stratum toward at least one offset well therein and displace oil into said offset well; and
    (3) recovering the displaced oil from said offset well.

2. The process of claim 1 wherein the surfactant of (b) is nonylphenoxypolyethanol having an average chain length on the hydrophilic end in the range of 6 to 6.5 mols or units of ethylene oxide.

3. The process of claim 1 wherein the surfactant of (c) is a nonylphenoxypolyethanol having an average chain length on the hydrophilic end in the range of 95 to 100 mols or units of ethylene oxide.

References Cited
UNITED STATES PATENTS

| 3,131,759 | 5/1964 | Slusser et al. | 166—9 X |
| 3,288,213 | 11/1966 | King | 166—9 |
| 3,306,761 | 2/1967 | Johnson | 106—307 |
| 3,323,589 | 6/1967 | Harvey | 166—9 |

JAMES A. LEPPINK, *Primary Examiner.*